US00RE48980E

(19) United States
(12) Reissued Patent
Gilson et al.

(10) Patent Number: US RE48,980 E
(45) Date of Reissued Patent: Mar. 22, 2022

(54) ACOUSTIC LINER WITH VARIED PROPERTIES

(71) Applicant: Raytheon Technologies Corporation, Farmington, CT (US)

(72) Inventors: Jonathan Gilson, West Hartford, CT (US); Constantine Baltas, Manchester, CT (US)

(73) Assignee: Raytheon Technologies Corporation, Farmington, CT (US)

(21) Appl. No.: 17/011,619

(22) Filed: Sep. 3, 2020

Related U.S. Patent Documents

Reissue of:
(64) Patent No.: 10,066,548
Issued: Sep. 4, 2018
Appl. No.: 14/766,267
PCT Filed: Mar. 11, 2014
PCT No.: PCT/US2014/023024
§ 371 (c)(1),
(2) Date: Aug. 6, 2015
PCT Pub. No.: WO2014/197035
PCT Pub. Date: Dec. 11, 2014

U.S. Applications:
(60) Provisional application No. 61/790,109, filed on Mar. 15, 2013.

(51) Int. Cl.
*F02C 7/045* (2006.01)
*F02K 1/82* (2006.01)
(Continued)

(52) U.S. Cl.
CPC ..... *F02C 7/045* (2013.01); *F01D 25/24* (2013.01); *F02C 7/24* (2013.01); *F02K 1/827* (2013.01);
(Continued)

(58) Field of Classification Search
CPC .. F01D 25/24; F02C 7/24; F02C 7/045; F02C 3/107; F02K 1/827; F05D 2250/283;
(Continued)

(56) References Cited

U.S. PATENT DOCUMENTS 2,917,276 A 12/1959 Klompas et al.
3,113,634 A 12/1963 Watters
(Continued)

FOREIGN PATENT DOCUMENTS

EP 0225805 A1 6/1987
EP 0305159 A2 3/1989
(Continued)

OTHER PUBLICATIONS

"AIResearch QCGAT Program Final Report", NASA Report CR-159758 (1979) by R. Heldenbrand and W.M. Norgren (Year: 1979).*

(Continued)

*Primary Examiner* — William C Doerrler
(74) *Attorney, Agent, or Firm* — Carlson, Gaskey & Olds, P.C.

(57) ABSTRACT

A geared turbofan engine includes a first rotor, a fan, a second rotor, a gear train, a fan casing, a nacelle and a plurality of discrete acoustic liner segments. The fan is connected to the first rotor and is capable of rotation at frequencies between 200 and 6000 Hz and has a fan pressure ratio of between 1.25 and 1.60. The gear train connects the first rotor to the second rotor. The fan casing and nacelle are arranged circumferentially about a centerline and define a bypass flow duct in which the fan is disposed. The plurality of discrete acoustic liner segments with varied geometric properties are disposed along the bypass flow duct.

28 Claims, 3 Drawing Sheets

(51) Int. Cl.
*F02C 7/24* (2006.01)
*F01D 25/24* (2006.01)
*F02C 3/107* (2006.01)

(52) U.S. Cl.
CPC ..... *F02C 3/107* (2013.01); *F05D 2240/40* (2013.01); *F05D 2250/00* (2013.01); *F05D 2250/283* (2013.01); *F05D 2250/37* (2013.01); *F05D 2260/963* (2013.01)

(58) Field of Classification Search
CPC ..... F05D 2250/37; F05D 2240/40; F05D 2250/00; F05D 2260/963
See application file for complete search history.

(56) References Cited

U.S. PATENT DOCUMENTS

| | | | | |
|---|---|---|---|---|
| 3,443,791 | A | 5/1969 | Sevetz et al. | |
| 3,508,838 | A | 4/1970 | Martenson | |
| 3,542,152 | A | 11/1970 | Adamson et al. | |
| 3,656,822 | A | 4/1972 | Schwartzman | |
| 3,821,999 | A | 7/1974 | Guess et al. | |
| 3,890,060 | A | 6/1975 | Lipstein | |
| 3,937,590 | A | 2/1976 | Mani | F02C 7/045 415/119 |
| 1,490,923 | A | 11/1977 | Marshall | |
| 4,122,672 | A | 10/1978 | Lowrie | |
| 4,235,303 | A | 11/1980 | Dhoore et al. | |
| 4,274,805 | A | 6/1981 | Holmes | |
| 4,291,080 | A | 9/1981 | Ely et al. | |
| 4,298,090 | A | 11/1981 | Chapman | |
| 4,321,897 | A | 3/1982 | Pelekis | |
| 4,478,551 | A | 10/1984 | Honeycutt, Jr. et al. | |
| 4,648,792 | A | 3/1987 | Baran, Jr. et al. | |
| 4,863,678 | A | 9/1989 | Shockling et al. | |
| 4,989,406 | A | 2/1991 | Vdoviak et al. | |
| 5,141,395 | A | 8/1992 | Carroll et al. | |
| 5,165,848 | A | 11/1992 | Plemmons | |
| 5,167,118 | A | 12/1992 | Torkelson | |
| 5,175,401 | A | 12/1992 | Arcas et al. | |
| 5,295,787 | A | 3/1994 | Leonard et al. | |
| 5,478,199 | A | 12/1995 | Gliebe | |
| 5,923,003 | A * | 7/1999 | Arcas | B64D 33/02 181/292 |
| 5,979,593 | A | 11/1999 | Rice et al. | |
| 6,152,698 | A | 11/2000 | Gregg et al. | |
| 6,179,086 | B1 | 1/2001 | Bansemir et al. | |
| 6,202,302 | B1 | 3/2001 | Descoteaux | |
| 6,360,844 | B2 | 3/2002 | Hogeboom et al. | |
| 6,609,592 | B2 | 8/2003 | Wilson | |
| 6,711,900 | B1 | 3/2004 | Patel et al. | |
| 6,925,809 | B2 | 8/2005 | Mowill | |
| 6,942,453 | B2 | 9/2005 | Tsuru et al. | |
| 7,303,372 | B2 | 12/2007 | West et al. | |
| 7,347,662 | B2 | 3/2008 | Balsdon | |
| 7,540,354 | B2 | 6/2009 | Morin et al. | |
| 7,549,845 | B2 | 6/2009 | Uwami et al. | |
| 7,572,098 | B1 | 8/2009 | Johnson | |
| 7,631,483 | B2 | 12/2009 | Mani et al. | |
| 7,963,362 | B2 | 6/2011 | Lidoine | |
| 8,040,007 | B2 | 10/2011 | Petrov et al. | |
| 8,209,952 | B2 | 7/2012 | Ress, Jr. | |
| 2001/0017232 | A1 | 8/2001 | Hogeboom et al. | |
| 2002/0023729 | A1 | 2/2002 | Didion et al. | |
| 2003/0006090 | A1 | 1/2003 | Reed | |
| 2004/0067131 | A1 | 4/2004 | Joslin | |
| 2004/0169122 | A1 | 9/2004 | Dodd et al. | |
| 2006/0169532 | A1 | 8/2006 | Patrick | |
| 2006/0169533 | A1 | 8/2006 | Patrick | |
| 2007/0234726 | A1 | 10/2007 | Patel et al. | |
| 2009/0025860 | A1 | 1/2009 | Midali et al. | |
| 2009/0162187 | A1 | 6/2009 | Merry et al. | |
| 2010/0111675 | A1 | 5/2010 | Wojtyczka et al. | |
| 2010/0232940 | A1 | 9/2010 | Ammann | |
| 2010/0236862 | A1 | 9/2010 | Sternberger et al. | |
| 2010/0251692 | A1 | 10/2010 | Kinde, Sr. | |
| 2010/0290892 | A1 | 11/2010 | Schwaller | |
| 2011/0004388 | A1 | 1/2011 | Winter | |
| 2011/0005054 | A1 | 1/2011 | Maurell et al. | |
| 2011/0115223 | A1 | 5/2011 | Stahlkopf et al. | |
| 2012/0076659 | A1 | 3/2012 | Robertson | |
| 2012/0085861 | A1 | 4/2012 | Mardjono et al. | |
| 2012/0099969 | A1 | 4/2012 | Gilman | |
| 2012/0111012 | A1 | 5/2012 | Axelsson et al. | |
| 2012/0128482 | A1 | 5/2012 | Dezouche et al. | |

FOREIGN PATENT DOCUMENTS

| | | | |
|---|---|---|---|
| EP | 0305159 | A3 | 3/1989 |
| EP | 0305159 | A3 | 1/1990 |
| EP | 0225805 | B1 | 3/1990 |
| EP | 0305159 | B1 | 11/1993 |
| EP | 2236763 | A2 | 10/2010 |
| GB | 2226600 | A | 7/1990 |
| GB | 2407344 | A | 4/2005 |
| GB | 2441148 | A | 2/2008 |
| JP | 2007292052 | A | 11/2007 |
| WO | 2004/070275 | A1 | 8/2004 |
| WO | 2011/106073 | A2 | 9/2011 |
| WO | 2012/007716 | A1 | 1/2012 |

OTHER PUBLICATIONS

AiReearch QCGAT Engine: Acoustic Test Results, NASA Doc ID 19800013843, General Aviation Propulsion, NASA Conference Publication 2126, pp. 65-100 (Mar. 1, 1980) by L.S.Kisner. (Year: 1980).*

International Search Report and Written Opinion for International Application No. PCT/US2014/023024 dated Dec. 22, 2014.

Petition for Inter Partes Review of U.S. Pat. No. 10,066,548. *General Electric Company*, Petitioner, v. *United Technologies Corporation,* Patent Owner. IPR2020-00405. Jan. 9, 2020.

Declaration of Wing Ng. In re U.S. Appl. No. 10/066,548. Executed Jan. 2, 2020. pp. 1-179.

Curriculum Vitae of Wing Ng. pp. 1-42.

Technical Report. (1976). Quiet clean short-haul experimental engine (QCSEE) under-the-wing (UTW) boiler plate nacelle and core exhaust nozzle design report. NASA/CR-135008. Oct. 1976. pp. 1-104.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 537-539, 548-549, 563-565, 630-632, 630-632, 661-670, 673-675, 682-685, 697-705, 726-727, 731-733, 801-805, 828-830, 862-864, 923-927.

Brines, G.L. (1990). The turbofan of tomorrow. Mechanical Engineering: The Journal of the American Society of Mechanical Engineers,108(8), pp. 65-67.

Ingard, U. (2010). Noise Reduction Analysis. Jones and Bartlett Publishers, pp. 24-27, 56-66, 105-121, 136-141.

Kraft, R.U. (1976). Theory and measurement of acoustic wave propagation in multi-segmented rectangular flow ducts. Ph.D. dissertation. University of Cincinnati, pp. 1-262.

Kisner, L.S. (1980). AiResearch QCGAT engine—acoustic test results. NASA Document ID: 19800013843. General Aviation Propulsion, NASA Conference Publication 2126. pp. 65-100.

Sen, S.N. (1990). Acoustics waves and oscillations. John Wiley & Sons. pp. 115-122.

Wendus, B.E., Stark, D.F., Holler, R.P., and Funkhouser, M.E. (2003). Follow-on technology requirement study for advanced subsonic transport. NASA/CR-2003-212467. pp. 1-47.

Hughes, C.E. (2001). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

HexWebTM Honeycomb Attributes and Properties (1999). Hexcel. pp. 1-36.

Hexcel. The basics on bonded sandwich construction. TSB 124. (1987). pp. 1-28.

(56) References Cited

OTHER PUBLICATIONS

Bitzer, T. (1997). Honeycomb Technology. Materials, design, manufacturing, applications and testing. Chapman & Hall. pp. 1-69, 80-97, 143-146, 200-204.
Heldenbrand, R. and Norgren, W. M. (1979). AiResearch QCGAT program final report. NASA/CR-159758. AiResearch 21-3071. pp. 1-187.
Brillouin, J. (1968). Sound absorption by structures with perforated panels. Translated by T.J. Schultz. Sounds and Vibration. vol. 2. No. 7. pp. 6-22.
Beggs, J.M. (1983). NASA News Release. Our First Quarter Century of Achievement . . . Just the Beginning. Release No. 83-132. pp. 1-24.
Ethell, J. L. (1986). NASA and General Aviation. Turbine Engines. NASA SP-485. pp. 57-60.
Gunston, B. (Ed.) (2000). Jane's aero-engines, Issue seven. Coulsdon, Surrey, UK: Jane's Information Group Limited. pp. 510-512.
Nacelle definition (6th ed. 2003). McGraw Hill Dictionary of Scientific and Technical Terms.
Smith, M. J. T. (1989). Aircraft noise. Cambridge Aerospace Series. Cambridge University Press. pp. 1-152.
Roux, E. (2007). Turbofan and turbojet engines database handbook. Editions Elodie Roux. Blagnac: France, pp. 41-45.
Mattingly, J.D., Boyer, K. M. (2016). Elements of gas turbine propulsion: Gas turbines and rockets. Second Edition. AIAA Education Series, pp. 12-18, 477.
Davies, D. and Miller, D.C. (1971). A variable pitch fan for an ultra quiet demonstrator engine. 1976 Spring Convention: Seeds for Success in Civil Aircraft Design in the Next Two Decades, pp. 1-18.
Wright, G.H. and Russell, J.G. (1980). The M.45SD-02 variable pitch geared fan engine demonstrator test and evaluation experience. Aeronautical Journal., vol. 84(836). Sep. 1980. pp. 268-277.
Knip, Jr., G. (1987). Analysis of an advanced technology subsonic turbofan incorporating revolutionary materials. NASA Technical Memorandum. NASA-TM-89868. May 1987. pp. 1-23.
Patent Owner's Preliminary Response. *General Electric Company,* Petitioner, v. *Raytheon Technologies Corporation,* Patent Owner. IPR2020-00405. May 8, 2020.
Krauskopf, L. and Shumaker, L. (2014). GE exec says avoided geared design in jet engine battle with Pratt. Reuters. Sep. 15, 2014. https://www.reuters.com/article/us-general-electric-united-techengine-dUSKBN0HA2H620140915.
Fisher, D. (2013). The billion-dollar bet on jet tech that's making flying more efficient. Forbes. Jan. 23, 2013. https://www.forbes.com/sites/danielfisher/2013/01/23/the-billion-dollar-bet-on-jet-tech-thats-making-flying-more-efficient/#73ac0db67713.
Tsang, D. (2011). Special Report: The Engine Battle Heats Up (Update 1). Aspire Aviation. May 10, 2011.
Minner, G. L. and Rice E. J. (1976). Computer method for design of acoustic liners for turbofan engines. NASA TMX-3317. NASA Lewis Research Center, pp. 1-94.
Decision. Granting Institution of Inter Partes Review. *General Electric Company,* Petitioner, v. *Raytheon Technologies Corporation,* Patent Owner. IPR2020-00405. Jul. 31, 2020.
Declaration of Rachel J. Watters on Authentication of Publication re Kisner. Executed Dec. 11, 2019.
Declaration of Rachel J. Watters on Authentication of Publication re Heldenbrand. Executed Dec. 10, 2019.
Declaration of Rachel J. Watters on Authentication of Publication re NASA CR-135008. Executed Dec. 10, 2019.
Declaration of Courtney H. Bailey. In re U.S. Pat. No. 8,511,605 B2. Executed Jul. 19, 2016. pp. 1-4.
NASA Technical Reports Server (NTRS) for Heldenbrand NASA/CR-159758.
NASA Technical Reports Server (NTRS) for Willis NASA/CR-159743.
NASA Technical Reports Server (NTRS) for Technical Report NASA/CR-135008.
What is the NTRS?—NASA Scientific and Technical Information (STI) Program. https://sti.nasa.gov/what-is-the-ntrs/#.X0zufXIKiUk.
Judgment. Final Written Decision. *General Electric Company,* Petitioner, v. *Raytheon Technologies Corporation,* Patent Owner. IPR2020-00405. Jul. 27, 2021.
Sowers, H.D. and Coward, W.E. (1978). QCSEE under-the-wing (UTW) engine acoustic design. NASA-CR-135267 Jan. 1, 1978. pp. 1-55.
Ruggles, C.L.(1978). QCSEE under-the-wing (UTW) graphite/PMR cowl development. NASA-CR-135279. Jul. 1, 1978. pp. 1-69.
Howard, D.F. (1977). QCSEE preliminary over-the-wing flight propulsion system analysis report. NASA-CR-135296. Jun. 1, 1977. pp. 1-161.
Aeronautical Propulsion. (1975). NASA Conference Publication. NASA SP-381. pp. 1-476.
Heidmann, M.F. and Dietrich, D.A. (1977). Nasa Technical Memorandum. Effects of Simulated Flight on Fan Noise Suppression. NASA-TM-73708. Oct. 1, 1977. pp. 1-34.
Neitzel, R., Lee, R. and Chamay, A.J. (1973) QCSEE Task II Final Report. Engine and Installation Preliminary Design. NASA-CR-134738. Jun. 1, 1973. pp. 1-333.
Powered-Lift Aerodynamics and Acoustics. (1976). NASA Conference Publication. NASA SP-406. pp. 1-496.
Loeffler, I.J., Smith, E.B. and Sowers, H.D. (1978). Acoustic Design of the QCSEE Propulsion Systems. N78-24067. pp. 335-356.
Luidens, R.W. (1978). Inlet Technology for Powered-Lift Aircraft. N78-24069. pp. 369-385.
Heidelberg, L.J. and Homyak, L. (1979). Full-Scale Engine Tests of Bulk Absorber Acoustic Inlet Treatment. NASA Technical Memorandum 79079. NASA-TM-79079. pp. 1-16.
Sowers, H.D. and Coward, W.E. (1978). QCSEE over-the-wing (OTW) engine acoustic design. NASA-CR-135268. Jun. 1, 1978. pp. 1-52.
Stimpert, D.L., McFalls, R.A. (1975). Demonstration of short-haul aircraft aft noise reduction techniques on a twenty inch (50.8 cm) diameter fan. vol. I. NASA-CR-134849. May 1, 1975. pp. 1-120.
Quiet Clean Short-Haul Experimental Engine (QCSEE) over the wing (OTW) design report. (1977). NASA-CR-134848. pp. 1-503.
Howard, D.F. (1976). QCSEE preliminary under the wing flight propulsion system analysis report. NASA CR-134868 Feb. 1, 1976. pp. 1-260.
Stotler, C.L., Jr., Johnson, E.A. and Freeman, D.S. (1977). QCSEE under-the-wing (UTW) composite nacelle subsystem test report. NASA-CR-135075. Jul. 1, 1977. pp. 1-75.
Stimpert, D.L. and Clemons, A. (1977). Acoustic analysis of aft noise reduction techniques measured on a subsonic tip speed 50.8 cm (twenty inch) diameter fan. NASA-CR-134891. Jan. 1, 1977. pp. 1-139.
Quiet Clean Short-Haul Experimental Engine (QCSEE) under-the-wing (utw) boiler plate nacelle and core exhaust nozzle design report. (1976). NASA-CR-135008. Oct. 1976. pp. 1-91.
Stimpert, D.L. (1979). QCSEE over-the-wing (otw) propulsion systems test report. vol. IV: Acoustic Performance. NASA-CR-135326 Feb. 1, 1979. pp. 1-133.
Johnson, E.A. (1978). QCSEE under-the-wing (utw) composite nacelle final design report. NASA-CR-135352. Aug. 1, 1978. pp. 1-114.
Willis, W.S. (1979). Quiet clean short-haul experimental engine (QCSEE) final report. NASA/CR-159473 pp. 1-289.
Clemons, A. (1979). QCSEE acoustic treatment development and design. NASA-CR-135266. May 1, 1979. pp. 1-333.
Quiet Clean Short-Haul Experimental Engine (QCSEE) Preliminary Analyses and Design Report. vol. I. (1974). NASA-CR-134838. Oct. 1, 1974 pp. 1-337.
Quiet Clean Short-Haul Experimental Engine (QCSEE) Preliminary Analyses and Design Report. vol. II. (1974). NASA-CR-1 34839. Oct. 1, 1974 pp. 1-630.
NASA Conference Publication. Quiet, powered-lift propulsion. Cleveland, Ohio. Nov. 14-15, 1978. pp. 1-420.
Kisner, L.S. (1980). AiResearch QCGAT Engine: Acoustic Test Results. Mar. 1, 1980. pp. 65-100.
Bloomer, H.E. and Samanich, N.E. (1980). QCSEE fan exhaust bulk absorber treatment evaluation. NASA-TM-81498 Jan. 1, 1980. pp. 1-18.

(56) References Cited

OTHER PUBLICATIONS

Bilwakesh, K.R., Clemons, A., and Stimpert, D.L. (1979). QCESS acoustic performance of a 50.8-cm (20-inch) diameter variable-pitch fan and inlet, acoustic data. NASA-CR-135118. Nov. 1, 1979. pp. 1-491.
Quiet Clean Short-Haul Experimental Engine (QCSEE) under-the-wing (utw) final design report. (Jun. 1977) NASA-CR-134847 Jun. 1, 1977 pp. 1-697.
Abbott, J.M., Diedrich, J.H. and Williams, R.C. (1978). Low-speed aerodynamic performance of 50.8-centimeter-diameter noise-suppressing inlets for the quiet, clean, short-haul experimental engine (QCSEE). NASA-TP-1178. Aug. 1, 1978. pp. 1-34.
Bilwakesh, K.R., Clemons, A., and Stimpert, D.L. (1979). QCSEE acoustic performance of a 50.8-cm (20-inch) diameter variable-pitch fan and inlet, acoustic data. vol. I. NASA-CR-135117. Apr. 1, 1979. pp. 1-281.
Bloomer, H.E. and Samanich, N.E. (1982). QCSEE under-the-wing engine acoustic data. NASA-TM-82691. May 1, 1982. pp 1-28.
Bloomer, H.E. and Loeffler, I.J. (1982). QCSEE over-the-wing engine acoustic data. NASA-TM-82708. May 1, 1982. pp. 1-558.
Extended European Search Reported for EP Application No. 14807350.5 dated Oct. 21, 2016 8 pages.

* cited by examiner

ACOUSTIC LINER WITH VARIED PROPERTIES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application *is a broadening reissue of U.S. Pat. No. 10,066,548* (*filed as U.S. application Ser. No. 14,766,267*), *which* claims the benefit of U.S. Provisional Application No. 61/790,109 filed Mar. 15, 2013, for "Acoustic Liner with Varied Properties" by Jonathan Gilson and Constantine Baltas, and claims the benefit of PCT application PCT/US2014/023024 filed Mar. 11, 2014, for "Acoustic Liner with Varied Properties" by Jonathan Gilson and Constantine Baltas.

BACKGROUND

This disclosure relates to gas turbine engines, and in particular, to an acoustic liner assembly for reducing emitted noise propagating through a duct.

During operation, an aircraft propulsion system generates noise that requires attenuation and control. The noise generated by operation of the aircraft propulsion system is of many different frequencies, some of which contribute disproportionately more noise to the overall emitted noise. Accordingly, the aircraft propulsion system is provided with a noise attenuation liner. Ideally, the noise attenuation liner will reduce or eliminate noise of all frequencies generated within the propulsion system. However, practical limitations reduce the efficient attenuation of noise at some frequencies in favor of other noise frequencies. For these reasons, noise attenuation liners are only tuned or tailored to attenuate the most undesirable frequencies with the greatest efficiency. Unfortunately, the compromises required to efficiently attenuate the most undesirable frequencies limits the effective attenuation of other noise frequencies.

SUMMARY

A geared turbofan engine includes a first rotor, a fan, a second rotor, a gear train, a fan casing, a nacelle and a plurality of discrete acoustic liner segments. The fan is connected to the first rotor and is capable of rotation at frequencies between 200 and 6000 Hz and has a fan pressure ratio of between 1.25 and 1.60. The gear train connects the first rotor to the second rotor. The fan casing and nacelle are arranged circumferentially about a centerline and define a bypass flow duct in which the fan is disposed. The plurality of discrete acoustic liner segments with varied geometric properties are disposed along the bypass flow duct.

A geared turbofan engine includes a gear train, a first rotor, a second rotor, a core casing, a nacelle, a fan casing, and an acoustic liner. The gear train connects the first rotor to the second rotor. The core casing extends circumferentially around the first rotor and defines a portion of an inner surface of a bypass flow duct. The nacelle and the fan casing extend circumferentially around the core casing and define an outer surface of the bypass flow duct. The acoustic liner has two or more zones disposed along the bypass flow duct. The two or more zones are tuned to attenuate a different frequency range of acoustic noise.

A gas turbine engine includes a fan, a fan casing, a nacelle, and a plurality of discrete acoustic liner segments. The fan is rotatably arranged along an axial centerline. The fan casing and the nacelle are arranged circumferentially around the centerline and define a bypass flow duct in which the fan is disposed. The plurality of discrete acoustic liner segments with varied geometric properties are disposed along the bypass flow duct.

A gas turbine engine includes a core casing, a nacelle, a fan casing, a fan, and an acoustic liner. The core casing extends circumferentially around the first rotor and defines a portion of an inner surface of a bypass flow duct. The nacelle and the fan casing extend circumferentially around the core casing and define an outer surface of the bypass flow duct. The fan is rotatably disposed in the bypass flow duct. The acoustic liner has two or more zones disposed in the bypass flow duct. The two or more zones are tuned to attenuate a different frequency range of acoustic noise.

DETAILED DESCRIPTION

Figure 1:
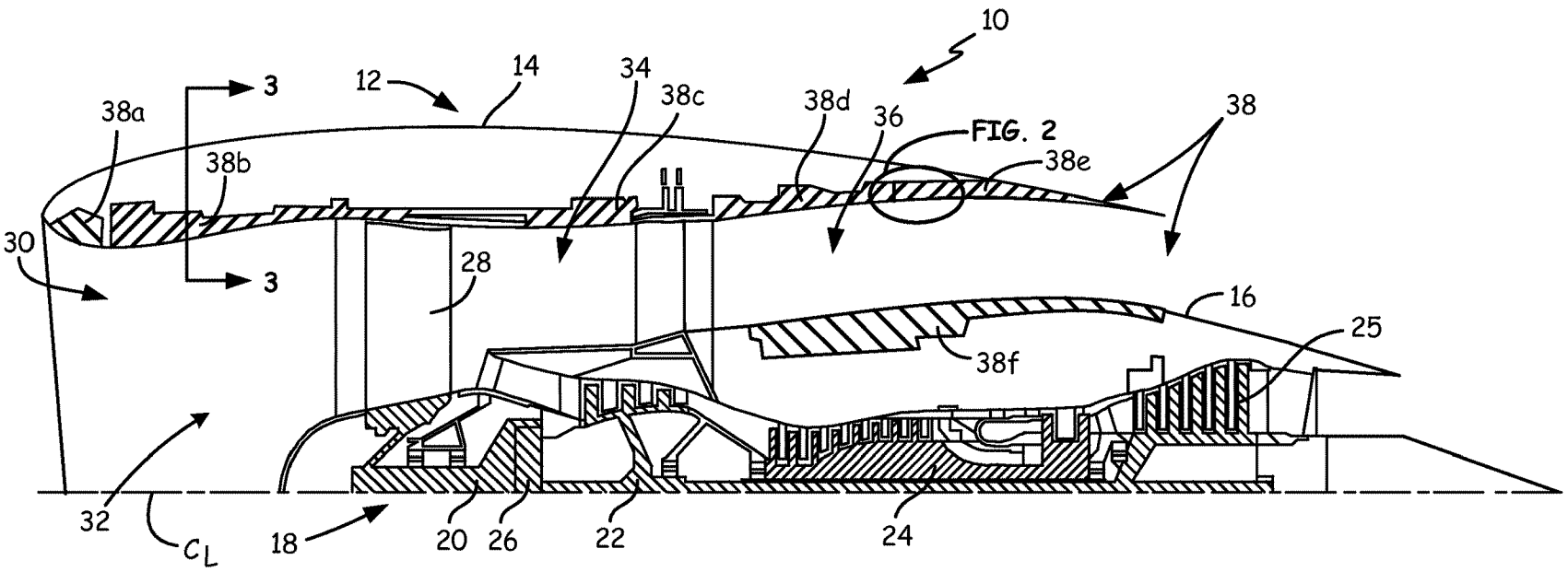
FIG. 1 is a cross-sectional side view of a geared turbofan engine with an acoustic liner.

As turbofan engines become increasingly more complex and efficient, their bypass ratios increase. A higher bypass ratio in a turbofan engine 10 leads to better fuel burn because the fan 28 is more efficient at producing thrust than the core engine 18. The introduction of a fan drive gear system 26 for turbofan engines 10 has also led to bypass ducts of shorter length. As a result, the total amount of available area for acoustic lining in a turbofan engine 10 with a fan drive gear system 26 is much less than for a direct drive engine. Additionally, a turbofan engine 10 with a fan drive gear system 26 creates asymmetric acoustics throughout the inside of the bypass duct. The turbofan engine 10 described herein utilizes an acoustic liner assembly 38 with varied geometric properties implemented in the bypass duct. These varied geometric properties include varying the radial thicknesses of one or more face sheets along an axial and/or circumferential length of the bypass duct, varying the radial thicknesses (sometimes called the depth) of one or more cores along an axial and/or circumferential length of the bypass duct, and/or varying the porosities of the one or more face sheets and/or one or more cores along an axial and/or circumferential length of the bypass duct. Thus, a three dimensional (axially, radially, and circumferentially) varied acoustic liner assembly 38 is created having regions with different non-uniform geometric properties. This allows the acoustic liner assembly 38 to be optimized based on the noise characteristics in particular locations/sections of the bypass duct. As a result of the varied geometric properties of acoustic liner assembly 38, multiple specific problematic frequency ranges within particular locations/sections of the bypass duct can be targeted and attenuated, reducing overall engine noise. Liner assembly 38 realizes noise reduction benefits for both tone noise and broadband noise. Depending on the blade passage frequency harmonic considered, estimated tone noise reductions at the component level may be up to 10 dB or more for tone acoustic power level. At the aircraft level, tone noise benefits of the liner assembly 38 provide a cumulative noise reduction of approximately 1-2 EPNdB.

FIG. 1 shows turbofan engine 10 with fan drive gear system 26, commonly called a geared turbofan. Although described with reference to a geared turbofan in the embodiment disclosed, the acoustic liner described herein is equally applicable to other types of gas turbine engines including three-spool architectures. Turbofan engine 10 includes nacelle 12 with outer cowl 14 and core cowl 16, and core 18. Core 18 includes first rotor 20, low speed spool 22, high speed spool 24, and fan drive gear system 26.

Fan 28 is connected to first rotor 20. Outer cowl 14 and core cowl 16 form bypass duct 30, which extends axially along engine 10 centerline axis $C_L$. Fan 28 is disposed to rotate within bypass duct 30. Inlet section 32 of bypass duct 30 is situated forward of fan 28. Fan section 34 of bypass duct 30 is situated around fan 28 and aft thereof. Rear section 36 of bypass duct 30 is disposed aft of fan section 34.

Liner assembly 38 is disposed on nacelle 12 and forms the surface of bypass duct 30. In particular, liner assembly 38 extends axially along and circumferentially around bypass duct 30. Additionally, liner assembly 38 has a thickness or depth and extends radially into outer cowl 14 and core cowl 16. In the embodiment of FIG. 1, liner assembly 38 has varied geometric properties such as differing radial thicknesses and porosities along the axial and circumferential length of bypass duct 30. In the embodiment of FIG. 1, liner assembly 38 is comprised of separate discrete liner segments 38a, 38b, 38c, 38d, 38e, and 38f each having varied geometric properties such as differing thicknesses and porosities along the axial length thereof. Liner segments 38a, 38b, 38c, 38d, 38e, and 38f can be further separated into additional segments or may be continuous in the circumferential direction. In yet other embodiments, liner segments 38a, 38b, 38c, 38d, 38e, and 38f may be instead constructed as a continuous liner assembly 38.

Liner segments 38a and 38b are disposed along and form inlet section 32 of bypass duct 30. Liner segment 38a is spaced from liner segment 38b and is disposed near a forward lip of bypass duct 30. Liner segment 38b extends adjacent to fan 28. Liner segment 38c extends around fan 28 and rearward thereof. Liner segment 38c forms fan section 34 of bypass duct 30. Liner segments 38d and 38e are mounted to outer cowl 14 and form a portion of rear section 36 of bypass duct 30. Rear section 36 is also formed by liner segment 38f which is mounted to core cowl 16.

In operation, fan 28 drives air along bypass flowpath 30 from inlet section 32 to rear section 36, while the compressor section within core 18 drives air along a core flowpath for compression and communication into the combustor section then expansion through the turbine section. As used herein, terms such as "front", "forward", "aft", "rear", "rearward" should be understood as relative positional terms in reference to the direction of airflow through engine 10.

In the embodiment of FIG. 1, engine 10 generally includes low speed spool 22 also (referred to as the low pressure spool) and a high speed spool 24 (also referred to as the high pressure spool). The spools 22, 24 are mounted for rotation about an engine central longitudinal axis $C_L$ relative to an engine static structure via several bearing systems. It should be understood that various bearing systems at various locations may alternatively or additionally be provided.

Low speed spool 22 generally includes a shaft that interconnects low pressure compressor and low pressure turbine. Low speed spool 22 is connected to and drives first rotor 20 through fan drive gear system 26 to drive the fan 42 at a lower speed than low speed spool 22. High speed spool 24 includes a shaft that interconnects high pressure compressor and high pressure turbine. Shafts are concentric and rotate via bearing systems about the engine 10 centerline axis $C_L$.

Engine 10 in one example has a bypass ratio is greater than about six (6), with an example embodiment being greater than ten (10). Fan drive gear system 26 is an epicyclic gear train, such as a planetary gear system or other gear system, with a gear reduction ratio equal to or greater than about 2.3. In one particular embodiment, fan drive gear system 26 may be an epicycle gear train, with a gear reduction ratio greater than about 2.5:1.

Low pressure turbine 25 has a pressure ratio that is greater than about five (5). In one disclosed embodiment, the bypass ratio of engine 10 is greater than about ten (10:1), and the diameter of fan 28 is significantly larger than that of the low pressure compressor. The Low pressure turbine 25 pressure ratio is pressure measured prior to inlet of low pressure turbine as related to the pressure at the outlet of low pressure turbine prior to an exhaust nozzle.

In one embodiment, fan 28 rotates at a frequency of between 200 and 6000 Hz. Acoustic frequencies within this range can be targeted such that liner assembly 38 can be tuned to attenuate frequencies between 200 and 6000 Hz. In other embodiments, liner assembly 38 can be tuned to attenuate frequencies less than 1000 Hz. One purpose of having liner assembly 38 with varied geometric properties (including different radial thicknesses) is to target blade passage tone noise which, for lower fan blade count turbomachinery and lower pressure ratio applications, exists at frequencies less than 1000 Hz.

Constructing one portion of liner with geometric properties (including a radial thickness) targeting these low frequencies will reduce the blade passage noise below 1000 Hz, while other portions of liner assembly 38 with different material and/or geometric properties will attenuate the rest of the tones and broadband noise at higher frequencies. It should be understood, however, that the above parameters are only exemplary of one embodiment of a geared architecture engine and that the present invention is applicable to other gas turbine engines including direct drive turbofans.

A significant amount of engine thrust is provided by the bypass flow through bypass duct 30 due to the high bypass ratio. Fan 28 is designed for a particular flight condition—typically cruise at about 0.8 Mach and about 35,000 feet. However, liner assembly 38 can attenuate acoustic noise between about 0.3 and 0.9 Mach. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.60. In another non-limiting embodiment, fan pressure ratio is between 1.25 and 1.60. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2:
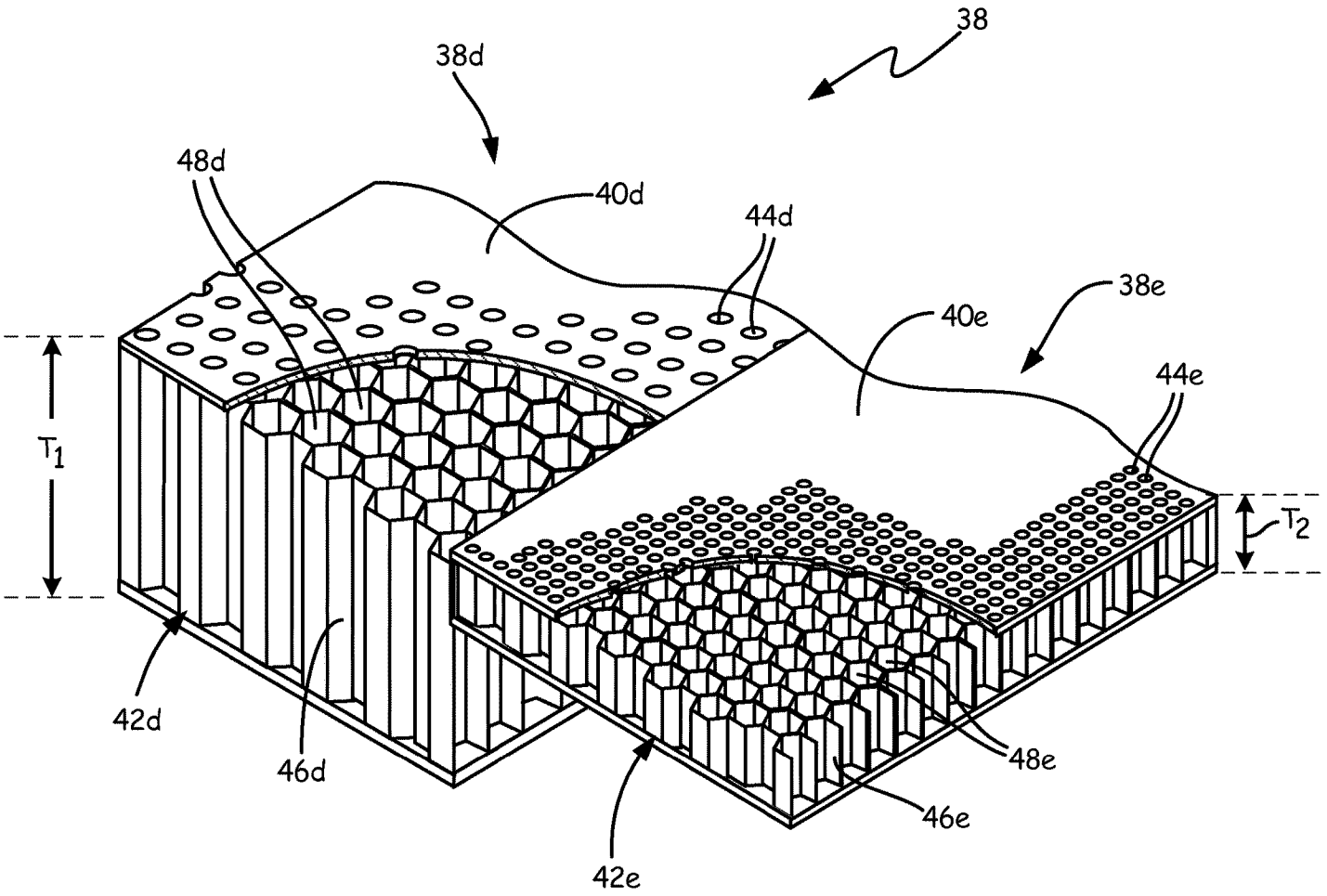
FIG. 2 is a perspective cross-sectional view of the acoustic liner from FIG. 1.

FIG. 2 is enlarged view of a portion of liner assembly 38 from the rear section 36 of bypass duct 30 (FIG. 1). FIG. 2 shows the abutting interface between liner segment 38d and liner segment 38e. Liner segment 38d includes face sheet 40d and core 42d. Face sheet 40d includes apertures 44d. Core 42d includes cells 46d that define cavities 48d. Similarly, in FIG. 2, liner segment 38e includes face sheet 40e and core 42e. Face sheet 40e includes apertures 44e. Core 42e includes cells 46e that define cavities 48e.

In FIG. 2, liner segments 38d and 38e are disclosed as discrete separate segments. Liner segment 38e is illustrated as a microperforated liner. Further discussion of the construction and operation of microperforated liners can be found in U.S. Pat. No. 7,540,354, which is incorporated herein by reference. Face sheets 40d and 40e have exterior surfaces that generally align and form the surface of bypass duct 30 (FIG. 1). Face sheets 40d and 40e are illustrated has having a same thickness in a radial direction with respect to axis centerline CL of engine 10 (FIG. 1) in FIG. 2. However, in other embodiments the thickness of face sheet 40d can vary from the thickness of face sheet 40e.

Face sheets 40d and 40e are bonded or otherwise affixed to cores 42d and 42e. In the embodiment of FIG. 2, cores 42d and 42e have differing (varied) thicknesses $T_1$, $T_2$ in a radial direction with respect to axis centerline $C_L$ of engine 10 (FIG. 1). In this embodiment, the thickness $T_1$ of core 42d is greater than the thickness $T_2$ of core 42e. In FIG. 2, cells 46d and 46e are illustrated with a similar hexagonal cross-sectional shape. However, in other embodiments cell shape can differ (for example have a circular cross-section) between liner segments 38d and 38e and cell size can vary between liner segments 38d and 38e. Thus, the cavities 48d and 48e formed by cells 46d and 46e may vary from one another in size and shape. As illustrated, cores 42d and 42e can be bonded or otherwise affixed to backing plates.

Figure 3:
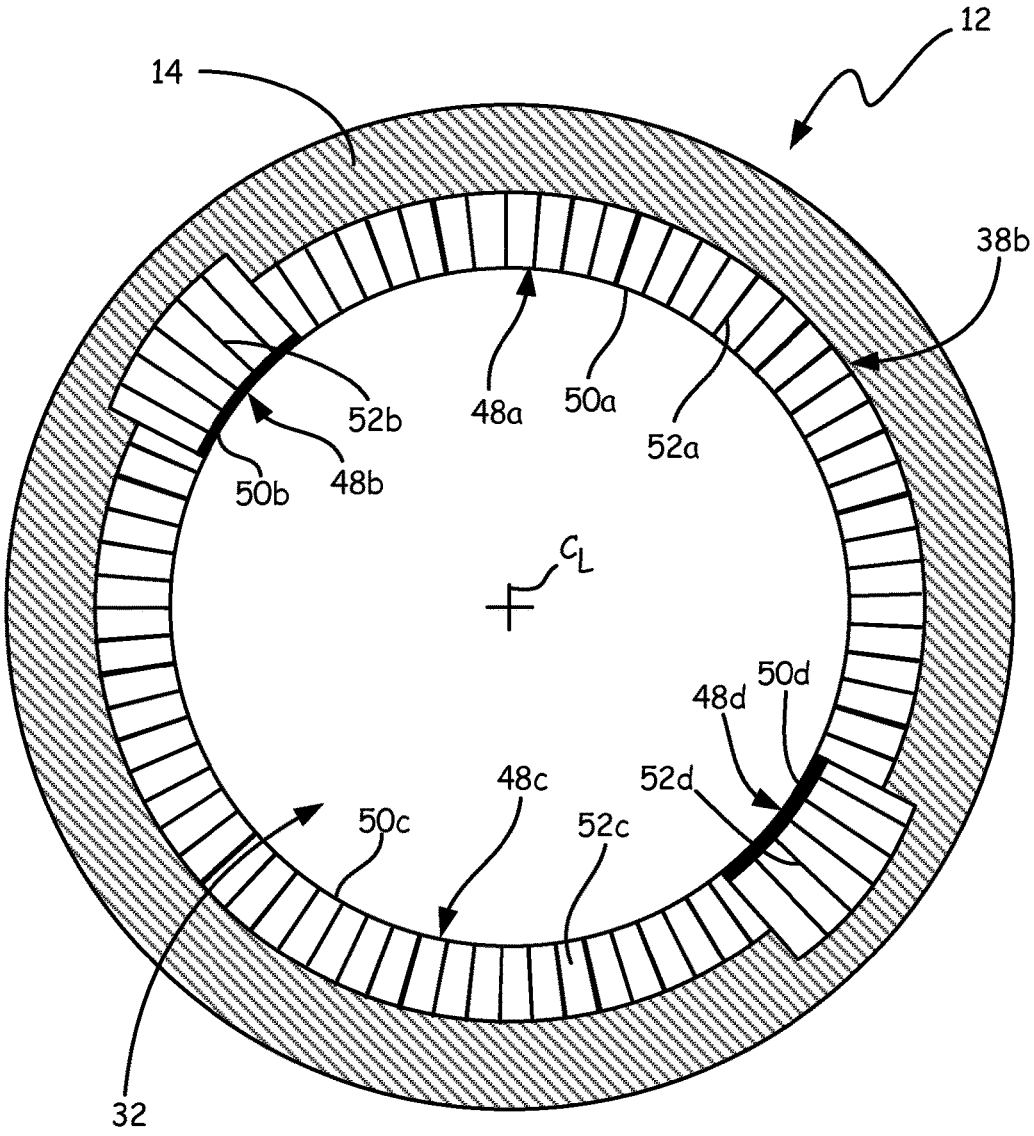
FIG. 3 is a cross-sectional view a portion of nacelle from FIG. 1 with a continuous acoustic liner.

FIG. 3 illustrates another cross-section of liner segment 38b and nacelle 12. The cross-section of FIG. 3 extends through outer cowl 14 in inlet section 32 of bypass duct 30 (FIG. 1). As shown in FIG. 3, liner segment 38b is continuously varied in a circumferential direction. Thus, liner segment 38b is one structure but is comprised (in the illustrated embodiment) of four zones 48a, 48b, 48c, and 48d. In the embodiment of FIG. 3, zones 48a and 48c exhibit similar geometric properties as zones 48a and 48c have similar radial thicknesses and porosities along the circumferential length of inlet duct 32 illustrated. Zones 48b and 48d have similar geometric properties as zones 48a and 48c have similar radial thicknesses and porosities along the circumferential length of inlet duct 32 illustrated. However, the geometric properties (i.e. radial thicknesses and porosities) of zones 48a and 48c differ (vary) from the geometric properties of zones 48b and 48d.

As shown in FIG. 3, zones 48a and 48c have similar properties because face sheets 50a and 50c have similar radial thicknesses with respect to engine centerline axis $C_L$, and have similar porosities. Similarly, zones 48b and 48d have similar properties because face sheets 50b and 50d have similar radial thicknesses with respect to engine centerline axis $C_L$, and have similar porosities. However, the radial thicknesses and porosities of face sheets 50a and 50c differ from the radial thicknesses and porosities of face sheets 50b and 50d.

Additionally, zones 48a and 48c have similar properties because cores 52a and 52c have similar radial thicknesses with respect to engine centerline axis $C_L$ and have similar porosities. Similarly, zones 48b and 48d have similar properties because cores 52b and 52d have similar radial thicknesses with respect to engine centerline axis $C_L$ and have similar porosities. However, the radial thicknesses and porosities of cores 52a and 52c differ from the radial thicknesses and porosities of cores 52b and 52d.

Fan noise source content may vary significantly in the circumferential direction with respect to engine centerline axis $C_L$. Liner assembly 38, by virtue of its with varied properties in a circumferential direction, allows alignment of high noise source magnitudes with optimal liner properties.

It should be understood that the embodiments of the FIGURES are purely exemplary. For example, rather than being segmented as discussed with reference to FIGS. 1 and 2, liner assembly 38 can be one continuously varied unit (both axially and circumferentially) for most or all of the axial length of bypass duct 30. In other embodiments, continuously varied liner segments (in either the axial or circumferential direction) can be utilized in combination with discrete separate liner segments (in either the axial or circumferential direction) along bypass duct 30.

Discussion of Possible Embodiments

The following are non-exclusive descriptions of possible embodiments of the present invention.

A geared turbofan engine includes a first rotor, a fan, a second rotor, a gear train, a fan casing, a nacelle and a plurality of discrete acoustic liner segments. The fan is connected to the first rotor and is capable of rotation at frequencies between 200 and 6000 Hz and has a fan pressure ratio of between 1.25 and 1.60. The gear train connects the first rotor to the second rotor. The fan casing and nacelle are arranged circumferentially about a centerline and define a bypass flow duct in which the fan is disposed. The plurality of discrete acoustic liner segments with varied geometric properties are disposed along the bypass flow duct.

The geared turbofan engine of the preceding paragraph can optionally include, additionally and/or alternatively, any one or more of the following features, configurations and/or additional components:

at least one discrete acoustic liner segment of the plurality of discrete acoustic liner segments is disposed on an inner surface of the nacelle inside the bypass flow duct;

at least one discrete acoustic liner segment of the plurality of discrete acoustic liner segments is disposed on an inner surface of the fan casing inside the bypass flow duct;

a core casing arranged circumferentially around the centerline within the nacelle and the fan casing and defining an inner surface of the bypass flow duct, and at least one discrete acoustic liner segment of the plurality of discrete acoustic liner segments is disposed on the inner surface of the bypass flow duct;

each of the plurality of discrete acoustic liner segments includes a cellular core structure, and wherein the cellular core structure of one of the plurality of discrete acoustic liners has a depth that differs from a depth of the cellular core structure of another of the plurality of discrete acoustic liner segments;

the cellular core structure of each of the plurality of discrete acoustic liner segments includes one or more resonator chambers, and wherein one of the one or more resonator chambers has a circumference that differs from a circumference of another of the one or more resonator chambers;

a cross-sectional geometry of the one or more resonator chambers of one of the plurality of discrete acoustic liner segments differs from a cross-sectional geometry of another of the one or more resonator chambers;

each of the plurality of discrete acoustic liner segments includes a face sheet with holes and the holes communicate with the resonator chambers in the cellular core structure, wherein a diameter of the holes in the face sheet of one of the plurality of discrete acoustic liner segments differs from a diameter of holes in the face sheet of another of the plurality discrete acoustic liner segments;

a number of the holes in the face sheet of one of the plurality of discrete acoustic liner segments differs from a number of the holes in the face sheet of another of the plurality of discrete acoustic liner segments;

a thickness of the face sheet of one of the plurality of discrete acoustic liner segments differs from a thickness of the face sheet of another of the plurality of discrete acoustic liner segments; and the face sheet of at least one of the discrete acoustic liner segments is micro-perforated.

A geared turbofan engine includes a gear train, a first rotor, a second rotor, a core casing, a nacelle, a fan casing, and an acoustic liner. The gear train connects the first rotor to the second rotor. The core casing extends circumferentially around the first rotor and defines a portion of an inner surface of a bypass flow duct. The nacelle and the fan casing extend circumferentially around the core casing and define an outer surface of the bypass flow duct. The acoustic liner has two or more zones disposed along the bypass flow duct. The two or more zones are tuned to attenuate a different frequency range of acoustic noise.

The geared turbofan engine of the preceding paragraph can optionally include, additionally and/or alternatively, any one or more of the following features, configurations and/or additional components:

the gear train comprises an epicyclic transmission;

a fan connected to the first rotor, and a low speed spool driving the second rotor, the low speed spool including a low pressure compressor section and a low pressure turbine section;

the fan rotates at frequencies under 1000 Hz and one of the zones is tuned to attenuate frequencies under 1000 Hz;

one of the zones is tuned to attenuate frequencies above 1000 Hz;

the acoustic liner is segmented into discrete axial segments;

the acoustic liner is segmented into discrete circumferential segments;

the acoustic liner is segmented into discrete segments and each discrete segment contains a single zone of the multiple zones; and the acoustic liner is segmented into discrete segments and each discrete segment contains more than one zone of the multiple zones.

A gas turbine engine includes a fan, a fan casing, a nacelle, and a plurality of discrete acoustic liner segments. The fan is rotatably arranged along an axial centerline. The fan casing and the nacelle are arranged circumferentially around the centerline and define a bypass flow duct in which the fan is disposed. The plurality of discrete acoustic liner segments with varied geometric properties are disposed along the bypass flow duct.

The gas turbine engine of the preceding paragraph can optionally include, additionally and/or alternatively, any one or more of the following features, configurations and/or additional components:

at least one discrete acoustic liner segment of the plurality of discrete acoustic liner segments is disposed on an inner surface of the nacelle inside the bypass flow duct;

at least one discrete acoustic liner segment of the plurality of discrete acoustic liner segments is disposed on an inner surface of the fan casing inside the bypass flow duct;

a core casing arranged circumferentially around the centerline within the nacelle and the fan casing and defining an inner surface of the bypass flow duct, and at least one discrete acoustic liner segment of the plurality of discrete acoustic liner segments is disposed on the inner surface of the bypass flow duct;

each of the plurality of discrete acoustic liner segments includes a cellular core structure, and wherein the cellular core structure of one of the plurality of discrete acoustic liners has a depth that differs from a depth of the cellular core structure of another of the plurality of discrete acoustic liner segments;

the cellular core structure of each of the plurality of discrete acoustic liner segments includes one or more resonator chambers, and wherein one of the one or more resonator chambers has a circumference that differs from a circumference of another of the one or more resonator chambers;

a cross-sectional geometry of the one or more resonator chambers of one of the plurality of discrete acoustic liner segments differs from a cross-sectional geometry of another of the one or more resonator chambers;

each of the plurality of discrete acoustic liner segments includes a face sheet with holes and the holes communicate with the resonator chambers in the cellular core structure, wherein a diameter of the holes in the face sheet of one of the plurality of discrete acoustic liner segments differs from a diameter of holes in the face sheet of another of the plurality discrete acoustic liner segments;

a number of the holes in the face sheet of one of the plurality of discrete acoustic liner segments differs from a number of the holes in the face sheet of another of the plurality of discrete acoustic liner segments;

a thickness of the face sheet of one of the plurality of discrete acoustic liner segments differs from a thickness of the face sheet of another of the plurality of discrete acoustic liner segments; and the face sheet of at least one of the discrete acoustic liner segments is micro-perforated.

A gas turbine engine includes a core casing, a nacelle, a fan casing, a fan, and an acoustic liner. The core casing extends circumferentially around the first rotor and defines a portion of an inner surface of a bypass flow duct. The nacelle and the fan casing extend circumferentially around the core casing and define an outer surface of the bypass flow duct. The fan is rotatably disposed in the bypass flow duct. The acoustic liner has two or more zones disposed in the bypass flow duct. The two or more zones are tuned to attenuate a different frequency range of acoustic noise.

The gas turbine engine of the preceding paragraph can optionally include, additionally and/or alternatively, any one or more of the following features, configurations and/or additional components:

the fan rotates at frequencies under 1000 Hz and one of the zones is tuned to attenuate frequencies under 1000 Hz;

one of the zones is tuned to attenuate frequencies above 1000 Hz;

the acoustic liner is segmented into discrete axial segments;

the acoustic liner is segmented into discrete circumferential segments;

the acoustic liner is segmented into discrete segments and each discrete segment contains a single zone of the multiple zones; and the acoustic liner is segmented into discrete segments and each discrete segment contains more than one zone of the multiple zones.

Although the present invention has been described with reference to preferred embodiments, workers skilled in the art will recognize that changes may be made in form and detail without departing from the spirit and scope of the invention.

The invention claimed is:

[1. A geared turbofan engine, comprising:

a first rotor;

a fan connected to the first rotor, wherein the fan is capable of rotation at frequencies between 200 and 6000 Hz and has a fan pressure ratio of between 1.25 and 1.60;

a second rotor;

a gear train that connects the first rotor to the second rotor;

a fan casing and a nacelle arranged circumferentially about a centerline and defining a bypass flow duct in which the fan is disposed; and a plurality of discrete acoustic liner segments having varied geometric properties disposed along the bypass flow duct; wherein the plurality of discrete acoustic liner segments comprises a first acoustic liner segment, and a second acoustic liner segment spaced apart from the first acoustic liner segment;

wherein each the first and second acoustic liner segments includes a cellular core structure, the cellular core structure comprising one or more resonator chambers having a width; and wherein the width of the one or more resonator chambers of the first acoustic liners differs from the width of the one or more resonator chambers of the second acoustic liner.]

[2. The geared turbofan engine of claim 1, wherein at least one discrete acoustic liner segment of the plurality of discrete acoustic liner segments is disposed on an inner surface of the nacelle inside the bypass flow duct.]

[3. The geared turbofan engine of claim 1, wherein at least one discrete acoustic liner segment of the plurality of discrete acoustic liner segments is disposed on an inner surface of the fan casing inside the bypass flow duct.]

[4. The geared turbofan engine of claim 1, wherein the gas turbine engine further comprises:

a core casing arranged circumferentially around the centerline within the nacelle and the fan casing and defining an inner surface of the bypass flow duct; and wherein at least one discrete acoustic liner segment of the plurality of discrete acoustic liner segments is disposed on the inner surface of the bypass flow duct.]

[5. The geared turbofan engine of claim 1, wherein the cellular core structure of one of the plurality of discrete acoustic liners has a depth that differs from a depth of the cellular core structure of another of the plurality of discrete acoustic liner segments.]

[6. The geared turbofan engine of claim 1, wherein a cross-sectional geometry of the one or more resonator chambers of one of the plurality of discrete acoustic liner segments differs from a cross-sectional geometry of another of the one or more resonator chambers.]

[7. The geared turbofan engine of claim 1, wherein each of the plurality of discrete acoustic liner segments includes a face sheet with holes and the holes communicate with the resonator chambers in the cellular core structure, wherein a diameter of the holes in the face sheet of one of the plurality of discrete acoustic liner segments differs from a diameter of holes in the face sheet of another of the plurality discrete acoustic liner segments.]

[8. The geared turbofan engine of claim 7, wherein a number of the holes in the face sheet of one of the plurality of discrete acoustic liner segments differs from a number of the holes in the face sheet of another of the plurality of discrete acoustic liner segments.]

[9. The geared turbofan engine of claim 7, wherein a thickness of the face sheet of one of the plurality of discrete acoustic liner segments differs from a thickness of the face sheet of another of the plurality of discrete acoustic liner segments.]

[10. The geared turbofan engine of claim 7, wherein the face sheet of at least one of the discrete acoustic liner segments is micro-perforated.]

[11. A geared turbofan engine, comprising:

a gear train connecting a first rotor to a second rotor;

a core casing extending circumferentially around the first rotor and defining a portion of an inner surface of a bypass flow duct;

a nacelle and a fan casing extending circumferentially around the core casing and defining an outer surface of the bypass flow duct; and an acoustic liner with two or more zones disposed along the bypass flow duct, the two or more zones being tuned to attenuate a different frequency range of acoustic noise;

wherein a first zone of the two or more zones comprises a first face sheet having a first radial thickness; and wherein a second zone of the two or more zones comprises a second face sheet having a second radial thickness different from the first radial thickness.]

[12. The geared turbofan engine of claim 11, wherein the gear train comprises an epicyclic transmission.]

[13. The geared turbofan engine of claim 11, wherein the geared turbofan further comprises:

a fan connected to the first rotor; and a low speed spool driving the second rotor, the low speed spool including a low pressure compressor section and a low pressure turbine section.]

[14. The geared turbofan engine of claim 13, wherein the fan rotates at frequencies under 1000 Hz and one of the zones of the acoustic liner is tuned to attenuate frequencies under 1000 Hz.]

[15. The geared turbofan engine of claim 13, wherein one of the zones of the acoustic liner is tuned to attenuate frequencies above 1000 Hz.]

[16. The geared turbofan engine of claim 11, wherein the acoustic liner is segmented into discrete axial segments.]

[17. The geared turbofan engine of claim 11, wherein the acoustic liner is segmented into discrete circumferential segments.]

[18. The geared turbofan engine of claim 11, wherein the acoustic liner is segmented into discrete segments and each discrete segment contains a single zone of the multiple zones.]

[19. The geared turbofan engine of claim 11, wherein the acoustic liner is segmented into discrete segments and at least one discrete segment contains more than one zone of the multiple zones.]

[20. A gas turbine engine, comprising:

a fan rotatably arranged along an axial centerline;

a fan casing and a nacelle arranged circumferentially around the centerline and defining a bypass flow duct in which the fan is disposed; and a plurality of discrete acoustic liner segments with varied geometric properties disposed along the bypass flow duct; wherein the plurality of discrete acoustic liner segments comprises a first acoustic liner segment, and a second acoustic liner segment spaced apart from the first acoustic liner segment;

wherein each the first and second acoustic liner segments includes a cellular core structure, the cellular core structure comprising one or more resonator chambers having a width; and wherein the width of the one or more resonator chambers of the first acoustic liners differs from the width of the one or more resonator chambers of the second acoustic liner.]

[21. The gas turbine engine of claim 20, wherein at least one discrete acoustic liner segment of the plurality of discrete acoustic liner segments is disposed on an inner surface of the nacelle inside the bypass flow duct.]

[22. The gas turbine engine of claim 20, wherein at least one discrete acoustic liner segment of the plurality of discrete acoustic liner segments is disposed on an inner surface of the fan casing inside the bypass flow duct.]

[23. The gas turbine engine of claim 20, wherein the gas turbine engine further comprises:

a core casing arranged circumferentially around the centerline within the nacelle and the fan casing and defining an inner surface of the bypass flow duct; and wherein at least one discrete acoustic liner segment of the plurality of discrete acoustic liner segments is disposed on the inner surface of the bypass flow duct.]

[24. The gas turbine engine of claim 20, wherein the cellular core structure of one of the plurality of discrete acoustic liners has a depth that differs from a depth of the cellular core structure of another of the plurality of discrete acoustic liner segments.]

[25. The gas turbine engine of claim 24, wherein a cross-sectional geometry of the one or more resonator chambers of one of the plurality of discrete acoustic liner segments differs from a cross-sectional geometry of another of the one or more resonator chambers.]

[26. The gas turbine engine of claim 24, wherein each of the plurality of discrete acoustic liner segments includes a face sheet with holes and the holes communicate with the resonator chambers in the cellular core structure, wherein a diameter of the holes in the face sheet of one of the plurality of discrete acoustic liner segments differs from a diameter of holes in the face sheet of another of the plurality discrete acoustic liner segments.]

[27. The gas turbine engine of claim 26, wherein a number of the holes in the face sheet of one of the plurality of discrete acoustic liner segments differs from a number of the holes in the face sheet of another of the plurality of discrete acoustic liner segments.]

[28. The gas turbine engine of claim 26, wherein a thickness of the face sheet of one of the plurality of discrete acoustic liner segments differs from a thickness of the face sheet of another of the plurality of discrete acoustic liner segments.]

[29. The gas turbine engine of claim 26, wherein the face sheet of at least one of the discrete acoustic liner segments is micro-perforated.]

[30. A gas turbine engine, comprising:

a core casing extending circumferentially around the first rotor and defining a portion of an inner surface of a bypass flow duct;

a nacelle and a fan casing extending circumferentially around the core casing and defining an outer surface of the bypass flow duct;

a fan rotatably disposed in the bypass flow duct; and an acoustic liner with two or more zones disposed in the bypass flow duct, wherein the two or more zones being tuned to attenuate a different frequency range of acoustic noise;

wherein a first zone of the two or more zones comprises a first face sheet having a first radial thickness; and wherein a second zone of the two or more zones comprises a second face sheet having a second radial thickness different from the first radial thickness.]

[31. The gas turbine engine of claim 30, wherein the fan rotates at frequencies under 1000 Hz and one of the zones of the acoustic liner is tuned to attenuate frequencies under 1000 Hz.]

[32. The gas turbine engine of claim 31, wherein one of the zones of the acoustic liner is tuned to attenuate frequencies above 1000 Hz.]

[33. The gas turbine engine of claim 30, wherein the acoustic liner is segmented into discrete axial segments.]

[34. The gas turbine engine of claim 30, wherein the acoustic liner is segmented into discrete circumferential segments.]

[35. The gas turbine engine of claim 30, wherein the acoustic liner is segmented into discrete segments and each discrete segment contains a single zone of the multiple zones.]

[36. The gas turbine engine of claim 30, wherein the acoustic liner is segmented into discrete segments and at least discrete segment contains more than one zone of the multiple zones.]

*37. A geared turbofan engine comprising:*

*an engine core comprising:*

*a first rotor connected to a fan;*

*a second rotor; and*

*a gear train connecting the first rotor to the second rotor;*

*a core casing disposed circumferentially around at least a portion of the engine core;*

*a nacelle disposed circumferentially around at least a portion of the core casing, wherein a bypass flow duct is defined between the nacelle and the core casing; and*

*an acoustic liner extending at least partially around a circumference of the bypass flow duct and disposed on an inner surface of the nacelle, the acoustic liner comprising:*

*a cellular core; and*

*a face sheet disposed on the cellular core and defining a surface of the bypass flow duct;*

*wherein a first circumferential zone of the acoustic liner extends around a first portion of the circumference of the bypass flow duct, in which the cellular core of the acoustic liner in the first circumferential zone includes multiple, circumferentially adjacent resonator chambers each having a first depth; and*

*wherein a second circumferential zone of the acoustic liner extends around a second portion of the circumference of the bypass flow duct, in which the cellular core of the acoustic liner in the second circumferential zone includes multiple, circumferentially adjacent resonator chambers each having a second depth different from the first depth.*

*38. The geared turbofan engine of claim 37,*

*wherein a geometric property of the face sheet in the first circumferential zone of the acoustic liner also differs*

*from a geometric property of the face sheet in the second circumferential zone of the acoustic liner.*

*39. The geared turbofan engine of claim 37, wherein a thickness of the face sheet of the acoustic liner in the first circumferential zone differs from a thickness of the face sheet of the acoustic liner in the second circumferential zone.*

*40. The geared turbofan engine of claim 37, wherein a porosity of the face sheet of the acoustic liner in the first circumferential zone differs from a porosity of the face sheet of the acoustic liner in the second circumferential zone.*

*41. The geared turbofan engine of claim 40, wherein a thickness of the face sheet of the acoustic liner in the first circumferential zone differs from a thickness of the face sheet of the acoustic liner in the second circumferential zone.*

*42. The geared turbofan engine of claim 37, wherein a width of the resonator chambers of the cellular core of the acoustic liner in the first circumferential zone differs from a width of the resonator chambers of the cellular core of the acoustic liner in the second circumferential zone.*

*43. The geared turbofan engine of claim 37, wherein a radial cross-sectional shape of the resonator chambers of the cellular core of the acoustic liner in the first circumferential zone differs from a radial cross-sectional shape of the resonator chambers of the cellular core of the acoustic liner in the second circumferential zone.*

*44. The geared turbo fan engine of claim 37, wherein the acoustic liner is disposed at an inlet section of the bypass flow duct such that the acoustic liner defines a surface of the inlet section of the bypass flow duct.*

*45. The geared turbofan engine of claim 44, comprising a second acoustic liner disposed at a rear section of the bypass flow duct, the second acoustic liner comprising:*

*a cellular core; and*

*a face sheet disposed on the cellular core and defining a surface of the rear section of the bypass flow duct;*

*wherein a geometric property of the cellular core of the second acoustic liner, a geometric property of the face sheet of the second acoustic liner, or both varies along an axial length of the rear section of the bypass flow duct.*

*46. The geared turbofan engine of claim 45, wherein the geometric property that varies along the axial length of the rear section of the bypass flow duct comprises a porosity of the face sheet of the second acoustic liner.*

*47. The geared turbofan engine of claim 45, wherein the cellular core of the second acoustic liner comprises resonator chambers, and*

*wherein the geometric property that varies along the axial length of the rear section of the bypass flow duct comprises a depth of the resonator chambers of the second acoustic liner.*

*48. The geared turbofan engine of claim 37, wherein at least a portion of the acoustic liner is configured to attenuate frequencies of less than 1000 Hz.*

*49. The geared turbofan engine of claim 37, wherein at a flight condition of the geared turbofan engine, the fan is configured to rotate at a frequency of between 200 Hz and 6000 Hz.*

*50. The geared turbofan engine of claim 37, wherein at a flight condition of the geared turbofan engine, the fan pressure ratio of the fan is between 1.25 and 1.60.*

*51. A geared turbofan engine comprising:*

*an engine core comprising:*

*a first rotor connected to a fan;*

*a second rotor; and*

*a gear train connecting the first rotor to the second rotor;*

*a core casing disposed circumferentially around at least a portion of the engine core;*

*a nacelle disposed circumferentially around at least a portion of the core casing, wherein a bypass flow duct is defined between the nacelle and the core casing; and*

*an acoustic liner extending at least partially around a circumference of the bypass flow duct and disposed on an inner surface of the nacelle, the acoustic liner comprising:*

*a cellular core; and*

*a face sheet disposed on the cellular core and defining a surface of the bypass flow duct;*

*wherein:*

*a first circumferential zone of the acoustic liner extends around a first portion of the circumference of the bypass flow duct, in which the cellular core of the acoustic liner in the first circumferential zone includes multiple, adjacent resonator chambers,*

*a second circumferential zone of the acoustic liner extends around a second portion of the circumference of the bypass flow duct adjacent the first portion of the circumference, in which the cellular core of the acoustic liner in the second circumferential zone includes multiple, adjacent resonator chambers,*

*a geometric property of the cellular core or a geometric property of the face sheet in the first circumferential zone of the acoustic liner differs from the corresponding geometric property of the cellular core or geometric property of the face sheet in the second circumferential zone of the acoustic liner, and*

*an arc length of the first circumferential zone along the circumference of the bypass flow duct is different from an arc length of the second circumferential zone along the circumference of the bypass flow duct.*

*52. The geared turbofan engine of claim 51, wherein the first and second circumferential zones each includes multiple subzones spaced circumferentially apart from one another.*

*53. The geared turbofan engine of claim 52, wherein there are exactly two subzones in each of the first and second circumferential zones.*

*54. The geared turbofan engine of claim 51, wherein a porosity of the face sheet of the acoustic liner in the first circumferential zone differs from a porosity of the face sheet of the acoustic liner in the second circumferential zone.*

*55. The geared turbofan engine of claim 54, wherein a depth of the resonator chambers of the cellular core in the first circumferential zone differs from a depth of the resonator chambers of the cellular core in the second circumferential zone.*

*56. The geared turbofan engine of claim 55, wherein a thickness of the face sheet of the acoustic liner in the first circumferential zone differs from a thickness of the face sheet of the acoustic liner in the second circumferential zone.*

*57. The geared turbofan engine of claim 54, wherein a thickness of the face sheet of the acoustic liner in the first circumferential zone differs from a thickness of the face sheet of the acoustic liner in the second circumferential zone.*

*58. The geared turbofan engine of claim 51, wherein a depth of the resonator chambers of the cellular core in the first circumferential zone differs from a depth of the resonator chambers of the cellular core in the second circumferential zone.*

*59. The geared turbofan engine of claim 58, wherein a thickness of the face sheet of the acoustic liner in the first circumferential zone differs from a thickness of the face sheet of the acoustic liner in the second circumferential zone.*

*60. The geared turbofan engine of claim 51, wherein a width of the resonator chambers of the cellular core in the first circumferential zone differs from a width of the resonator chambers of the cellular core in the second circumferential zone.*

*61. The geared turbofan engine of claim 51, wherein at least a portion of the acoustic liner is configured to attenuate frequencies of less than 1000 Hz.*

*62. The geared turbofan engine of claim 51, wherein at a flight condition of the geared turbofan engine, the fan is configured to rotate at a frequency of between 200 Hz and 6000 Hz.*

*63. The geared turbofan engine of claim 51, wherein at a flight condition of the geared turbofan engine, the fan pressure ratio of the fan is between 1.25 and 1.60.*

*64. The geared turbofan engine of claim 51, wherein a thickness of the face sheet of the acoustic liner in the first circumferential zone differs from a thickness of the face sheet of the acoustic liner in the second circumferential zone.*

* * * * *